United States Patent [19]
Rosewarne et al.

[11] Patent Number: 5,729,674
[45] Date of Patent: Mar. 17, 1998

[54] METHOD AND APPARATUS FOR PRODUCING PERSONALIZED GRAPHICS AND PERSONALIZED TEXT PRINTED MATERIALS

[75] Inventors: Fenton Rosewarne, Orinda, Calif.; Mary Rose Keller, Kennett Square, Pa.; Walter Winter, Sacramento; James Schuyler, San Francisco, both of Calif.

[73] Assignee: Computer Humor Systems, Inc., Los Angeles, Calif.

[21] Appl. No.: 418,790

[22] Filed: Apr. 7, 1995

[51] Int. Cl.$^6$ .................................................. G06T 11/00
[52] U.S. Cl. ...................................................... 395/135
[58] Field of Search ................................. 395/133–139, 395/155–161, 326, 333, 334, 141

[56] References Cited

U.S. PATENT DOCUMENTS 4,616,327 10/1986 Rosewarne et al. ............ 395/103 X
4,731,743 3/1988 Blancato ............................ 395/135

Primary Examiner—Almis R. Jankus
Attorney, Agent, or Firm—Wagner & Middlebrook

[57] ABSTRACT

Method and apparatus for capturing, editing, storing, and reproducing multiple graphic image components for the production of personalized printing materials. From data entered in the computer, personal characteristics of the customer are selected and the image of the customer is integrated into a pre-printed background. Both method and apparatus allow for controlled additive coloration to a basic background to incorporate shading, contour, fine detail, and variation in skin tone and hair color in the finished drawing of the customer.

18 Claims, 23 Drawing Sheets

Sample Data Card

Master Original Drawings. 4 mouths.

Sample Data Card

MAIL THIS CARD NOW TO SEND YOUR CHILD ON THE TRAVEL ADVENTURE OF A LIFETIME

☑ FIRST
☐ EDITION
☐ PUBLISHING presents "Look at ME!", an exciting adventure series featuring your child. These highly educational books show your child illustrated throughout each exciting story. You and your child will delight in discovering the wonderful sights and people of China, France, Australia, Africa and many more special places. Each personalized full color, hard cover First Edition picture book will be treasured by your 4 to 8 year old.

Please accept my child's enrollment in the "Look at ME!" adventure club. Send the first personalized, 32 page, story book plus FREE color poster map and travel stickers to track each future adventure. Enclosed is $7.95 for the first book, plus $1.00 for shipping and handling. Every 6 weeks please send a unique, one of a kind, storybook so we can discover more places and make new friends. Charge me only $7.95 plus shipping for each new adventure.

Childs Name FIRST __MARCIA__ LAST __LOPEZ__  Birthdate: Month __4__
Address __20 ONE WAY STREET__ Apt# __B__ Day __25__
City __GLENDALE__ State __CA__ Zip __90071__ Year __79__

CHILDS DESCRIPTION: Boy☐ Girl☑ — Am/Indian☐ Asian☐ Black☐ Hispanic☑ White☐ Other☐
BUILD: Thin☐ Average☑ Chubby☐   FRECKLES: Yes☐ No☑   GLASSES: Yes☐ No☑
HAIR COLOR: Black☑ Brown☐ Red☐ Blonde☐

BOYS HAIR STYLE: Check one box only    HAIR LENGTH: Short☐ Medium☐ Long☐

GIRLS HAIR STYLE: Check one box only   HAIR LENGTH: Short☐ Medium☑ Shoulder☐ Long☐   BANGS: Yes☑ No☐

Parent's Signature _____   Phone# (415) 000 0000
Copyright © 1984 Computer Humor™ Systems, Inc. Los Angeles. All Rights Reserved.

FIG. 5

Master Original Drawings. (actual size) 3 angles, 4 mouths.

Change of expression. Alternate mouths.

FIG. 12
4 sizes and reverse angle.
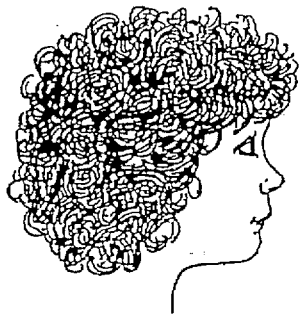
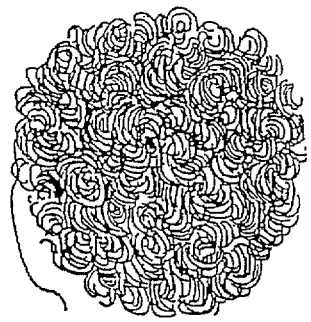
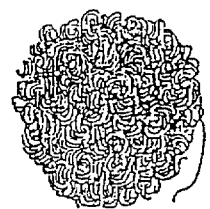

"I bet they'll taste even better with lemonade," said Kate. "Mr. Orsino gave us some because we built a scarecrow for his garden."

"I bet they'll taste even better with lemonade," said Kate. "Mr. Orsino gave us some because we built a scarecrow for his garden."

He started home. It was hopeless.

Then he saw a man go to the automatic teller at the bank. He stopped to watch. The man slid his card in the machine and money came out.

When he left, Jason poked his card in the slot.

The machine clicked and rumbled and whirred. And out came —

A TICKET!!

Across the top it said "Jason's Ticket to China." At the bottom it said, "When you get there, someone will meet you."

He grinned. A ticket to China was better than money, any day!

FIG. 22

METHOD AND APPARATUS FOR PRODUCING PERSONALIZED GRAPHICS AND PERSONALIZED TEXT PRINTED MATERIALS

BACKGROUND OF THE INVENTION

In the development of the first computer controlled system for producing personalized graphics and text products which is the subject of U.S. Pat. No. 4,616,327 issued Oct. 7, 1986, we recognized that the application of such a system to the production of personalized books, particularly for children was a desirable application. The original use of the invention has been in the production of posters and other personalized novelty or occasional materials.

In the exploration of book applications, it became immediately apparent that the personalized book affords an opportunity to explore and refine the basic principles disclosed in the aforementioned patent of one of the co-inventors of this invention and to provide personalized meaningful texts with graphics rising to the level of complementary caricatures of the person represented.

The system and method of the U.S. Pat. No. 4,616,327 utilizes a standardized pre-printed background containing background graphics and text with openings in both the text and background for the insertion of personalized images and names or other terms. A plurality of graphical segments such as nose profiles are stored in a digital computer as are other details such as sports equipment representations, glasses, and the like. A data input device such as a card reader is adapted to read personalized data such as sex, age group, hair style and length, glasses or no glasses and favorite sport or hobby. The computer receives the personalized data and uses it to select graphical and text files which are output to a plotter or other representation producing device. The plotter or other device produces line sketches at the appropriate portion of the background consistent with the personalized data. Personalized text augments the pre-printed text at the proper location.

The above described invention, when applied to books, adds much more personalization than heretofore possible. As noted in the background section of U.S. Pat. No. 4,616,327, prior to that invention, personalization of books, particularly for children, has been limited to personalized text as in U.S. Pat. Nos. 3,982,744 and 3,892,427.

Personalized books do not lend themselves to mass centralized mass production as in conventional book publishing facilities since each book printed is unique and most need to be delivered to a different person or address. Facing the need for a system which is compatible with both personalization of text and graphics yet producible in a continuous process with commercial level quality assurance.

BRIEF DESCRIPTION OF THE INVENTION

Computer capabilities and large-scale storage of information and images in electronic or optical forms, coupled with our inventive contribution can allow us to provide:

1. Graphical characterization to be added to the images portrayed in a personalized book, including shading, detail, size, angular and spatial transformations, skin tone, and appropriate facial or bodily expressions or positions.

2. Images may be stored as a picture, as a series of pen strokes, or as a combination of these, and may be compressed to reduce the amount of storage space required.

3. Various typefaces may be stored, selected and printed in accordance with the story being told, for example, a portion of the personalized text constituting a hand written letter, appears in childlike handwriting.

4. Personalized graphics in the form of additive line detail, color and shading are developed corresponding to basic preprinted multicolored backgrounds. Under computer control the line detail and correct color density are affixed to the pre-printed backgrounds in order to create the final image. For example, the basic hair background for either a boy or a girl appears as a muted yellow region surrounding the head. For either a blond girl or boy, appropriate line definition is added. For brown hair, a medium screen pattern of appropriate color is added to the background yellow along with the detail lines. For black hair, a dark brown or black screen is added to the basic yellow along with the detail lines. The same background therefore serves for both boy and girl blond through black hair. Ethnic differences also are represented in this same manner for the face and exposed skin such as hands.

These are all accomplished in accordance with this invention employing a system which comprises a graphics subsystem, a data/order entry subsystem, a product definition and printing subsystem, a book assembly subsystem and a fulfillment subsystem. The word subsystem is here employed in its generic sense. Any given subsystem may be either a separate physical component such as a computer or may be a logical or programmatic subsystem within a computer. Several subsystems may exist within a single computer, one subsystem may be spread among several computers, or the execution of the programs comprising a subsystem may be assigned arbitrarily by the network management subsystem to a computer or other component within a network composed of computers, storage devices and printers. Computers in the entire system are typically interconnected via networking software and hardware to facilitate the transfer of information from one subsystem to another. The graphics subsystem employs a color optical scanner for scanning facial and other appearance components generated by an artist. These graphics are digitized, edited and stored in digital form where they will be available to the printing subsystem. Rotation, scaling and colorization take place before storage so that images are ready for rendering on paper. The data/order entry subsystem includes a keyboard or card scanner/reader and data storage intended to hold personalized data as well as customer information for use in controlling the product definition process. The product definition and printing subsystem receives inputs from the data entry subsystem and in combination with a printer and its controller which has access to the files generated by the graphics subsystem, provides sets of collated personalized text and graphics book signatures. The book assembly subsystem takes the sets and completes them through binding with appropriate invoice and mailing label attached. The fulfillment subsystem includes a bar code scanner for identifying books actually mailed and feeds that information back to the product definition subsystem to identify ordered books which did not successfully complete the production cycle.

The graphics subsystem combines both line drawn features and shading overlays, plus color information, which are then combined in the printing stage with the basic background and coloration to give line detail to the personalized characters of the book as well as appropriate shading. This subsystem also stores the graphics in preparation for their eventual use in the product definition and printing subsystem.

The data/order entry subsystem introduces personalized data and customer information into the system and also provides customer subscription information to the product definition subsystem.

Quality control during print production is achieved by employing the built-in print quality capability of the laser printer equipment along with a bar code reader which is used to monitor completeness of each page set and correct order of the pages in each set. The product definition and printing subsystem as well as the fulfillment subsystem feed quality control information back to the data/order entry subsystem which is used to regenerate orders which have been skipped, incompletely printed or lost during the book assembly process prior to shipping.

The fulfillment subsystem provides a basis for comparing completed books with those ordered to identify any order having any discrepancy, as a result, for example, of a quality control discrepancy during the print cycle.

The overall method of this invention involves the generation of basic background and standardized text for printing on a multicolor printer and collation into book sets. Next, personalized graphics generation includes the steps of an artist producing a variety of facial details as in the earlier Rosewarne patent, but additionally the artist produces a number of overlays corresponding in shape to the hair and exposed skin of the subject. The various feature components and overlays are prepared on the computer or are optically scanned in accordance with this new method and stored in the graphics subsystem for utilization in providing the personalized graphics on the finished product.

The method of this invention also includes the combination of background standard text and pre-printed art backgrounds for the characters to be personalized with a basic coloration in the exposed skin areas of the figures. This basic coloration area is featureless and when combined with the selected features from the graphics subsystem, produces a light skinned featured, appropriately shaded, figure. If the data input indicates a darker complexioned subject, the addition of a selected overlay brings the skin to the appropriate coloration through the additive color process under the control of the computer. The printing method steps include printing the books set by set with the appropriate personalized graphics, personalized text and typefaces on the correct pages. Quality control of the print process is employed to control print quality and sheet order and completeness of each set. The completion of the sets into bound books is in accordance with established practice but with the addition of fulfillment scanning of the completed books and introduction of discrepancy information into the product definition and printing subsystem to initiate the reprinting of missing books.

Our unique invention involves the ability, in a production publishing environment, to illustrate the customer in personalized, printed material with a focus on children's picture books. This task is accomplished without the need for photographic input, but rather is achieved from a collection of several data items entered into the computer. The data items cause a number of discrete drawing components to be assembled into a complete illustration which can then be printed by a laser printer on a background of choice. We can illustrate a full range of human characteristics such as the customer's sex, ethnic features, indications of body size, hair style and length, glasses, freckles, and skin coloring. Different personalized materials can be created depending upon the story line or content of the book.

By employing our invention, we can produce the customers image in a variety of illustration styles ranging from simple line drawings to complex renderings employing fine line quality, shading, and dimension. We can illustrate the customer in a variety of poses, views, postures and expressions through manipulation of the graphic components in our graphic database. We can employ a range of color variation in hair from pale blond to black as well as using the complementary skin tones by use of various "overlay screens" printed over the pre-printed color background. Each of these variations can be incorporated in sequential books in a production line with each book personalized and unique in a graphical sense from the others.

One important improvement of the system cited in this invention over prior efforts, is the method of capturing and storing the data for the graphics. The complexity of the drawings necessitates greater control over line quality. Therefore, the drawings are entered and stored as pictures rather than "vectors", as in the previous system of the Rosewarne U.S. Pat. No. 4,616,327. This allows an illustration to be drawn, digitized, stored and then edited pixel by pixel to enhance its quality or change its appearance. The edited image can then be stored and later retrieved to be used in a variety of ways.

Important to this invention is the fact that with our invention illustrations of faces, hair, and all exposed skin can now have appropriate shading, line details and coloration to achieve a more natural appearance.

Because of the increased complexity of the stored graphics, we have incorporated new printing technology to increase the page print speed.

Each finished book will appear as a custom, professionally printed, high quality publication as all personalized material will be fully integrated into the pre-printed material. The text of the book or story is personalized to include names and phrases corresponding to the personalized data from the data/order entry subsystem. We are able to personalize the story with not only specific details supplied by the customer, but also by use of a variety of typefaces and graphics suggested by the story line, including appropriate facial expressions. The customer will not be able to distinguish the standard pre-printed material from the personalized material overprinted by the laser printer. Prior personalized printing systems have not had the ability to produce the variety of print styles used in normal offset professional printing. Therefore, the added personalized material was easily detected. The most significant innovation is the fact that an image of the customer will appear, rather than the generic, unidentifiable characterization heretofore considered state of the art for personalized books. Furthermore, the customer will not appear as a static onlooker, but as an active participant in the story through liberal use of a variety of postures and expressions.

BRIEF DESCRIPTION OF THE DRAWING

This invention may be more clearly understood from the following detailed description and by reference to the drawing in which:

FIG. 5 is a sample data card for supplying data used to personalize the text and the graphics used in this invention;

FIG. 12 is a composite of three different views of a child's head in four different sizes;

FIG. 22 is a sample of a pre-printed page with personalized text and graphics overprinted.

DETAILED DESCRIPTION OF THE INVENTION

Figure 1:
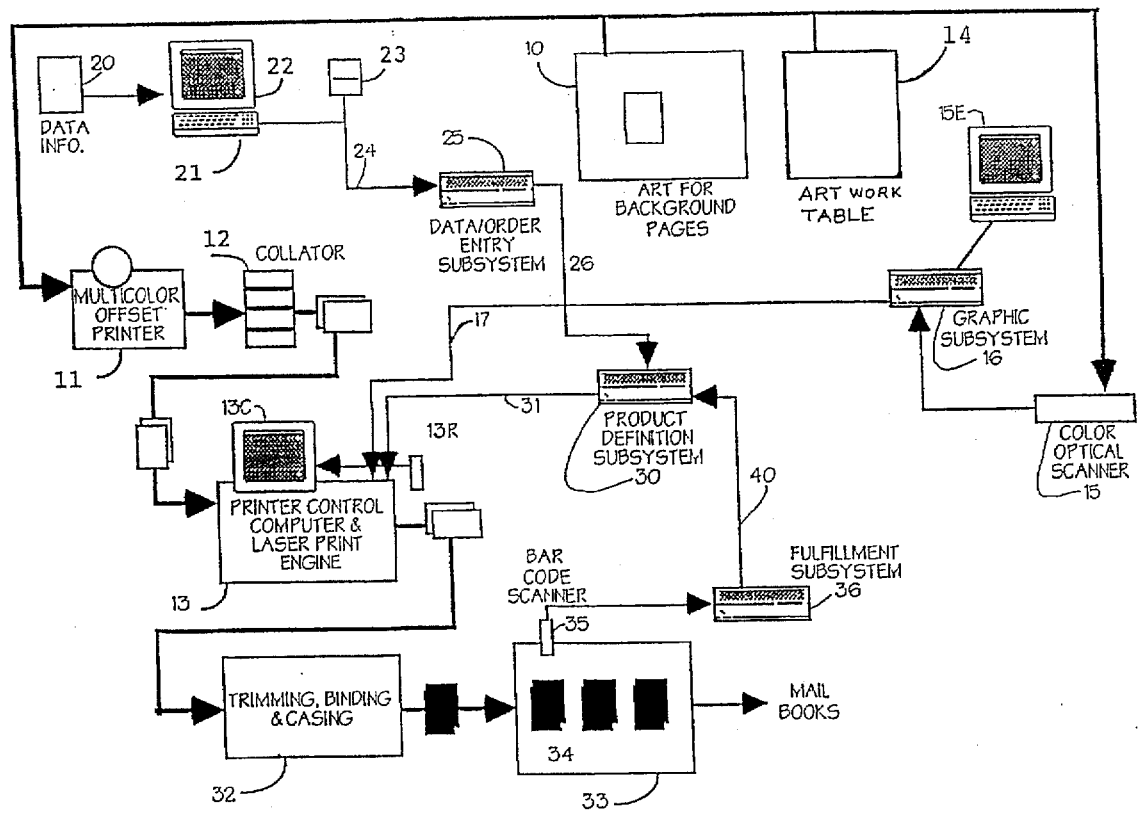
FIG. 1 is a simplified perspective of the system and method of this invention.

For an understanding of the method and apparatus of this invention, reference is made to FIG. 1 which is a schematic presentation of the equipment components plus a flow of information and product through the system to produce personalized books.

The first step of the process as represented by artist drafting table 10 is the preparation of art work for backgrounds for all illustrations used in the book. Typically a 16 sheet, (32 page) personalized book will include as many as 26 illustrations, most of which will be of fixed content but a number of which will include variable graphics in accordance with this invention. The art work prepared by the artist is color separated and converted to printing plates which are introduced into the multicolor offset sheet-fed printer 11 from which the background sheet exits to collator 12 where the sheets are grouped in sequence, each group constituting a set of pages, making up a single book when completed. "Cut sheet" printing is used rather than continuous form fed paper printing because sheets must be fed through the laser printer for over-printing of the personalized graphics. The multicolor offset printer 11 may also produce a two page set consisting of a mailing label and an invoice, one for each set to be introduced into a laser printer 13.

In addition to the original background art work done at table 10, a second set of art work is prepared illustratively at table 14. This set of art work comprises a variety of human feature components as illustrated in FIG. 2.

Figure 2:
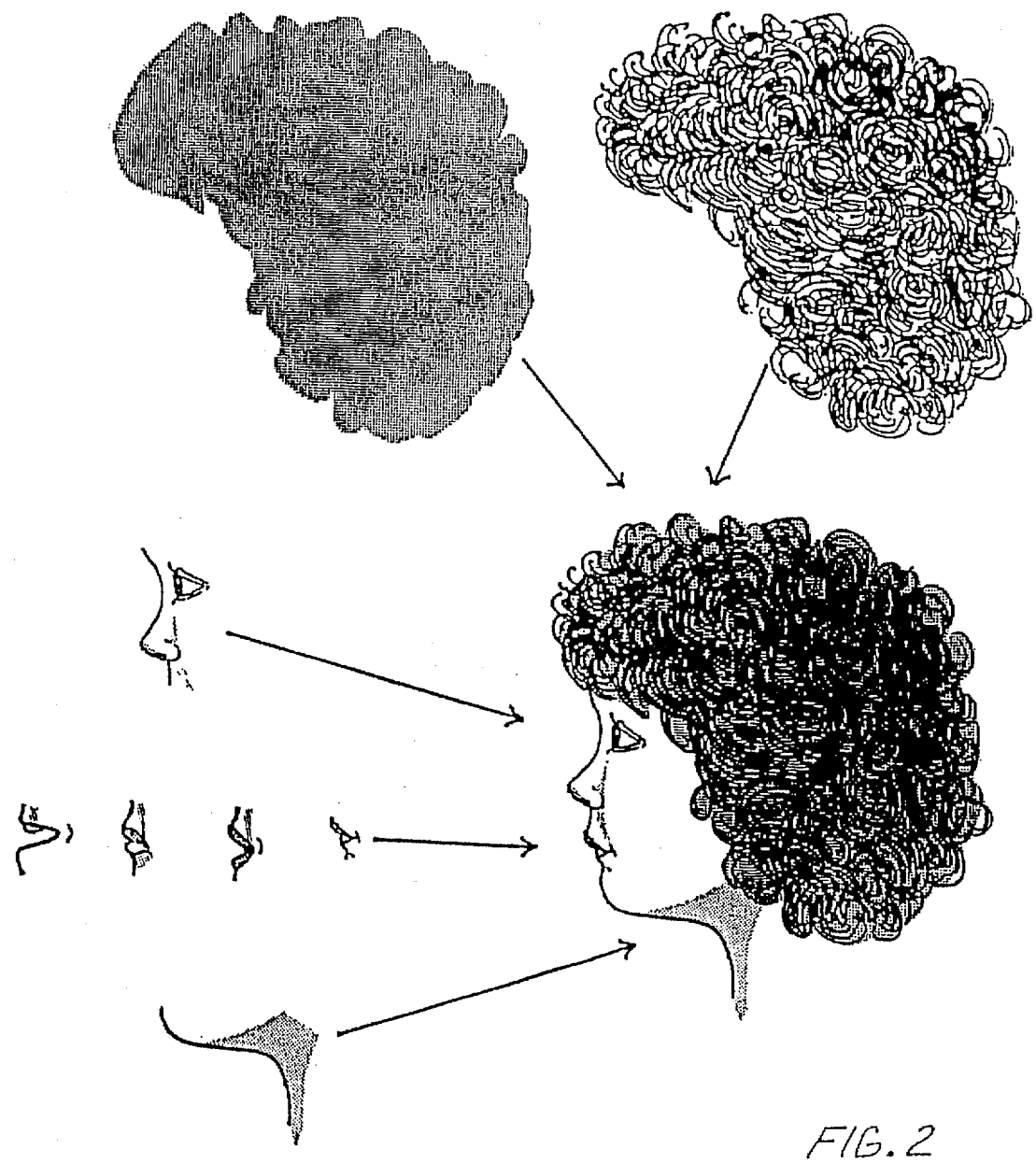
FIG. 2 is a composite of a set of graphical renderings produced by an artist for this invention.

This figure shows at the upper left a screen pattern which corresponds in shape to a lined pattern of hair shown at the upper right of FIG. 2.

At the lower left, a number of facial details including four examples of mouths and one of an eye-nose combination, as well, as one chin showing natural shading, are shown. For purposes of illustration in FIG. 2 but not generated in its completed form at table 14, is a profile of a child with curly black hair and generally an expression of awe.

The art work components generated at table 14 are introduced into an optical image scanner 15 which serves to image each of the facial components and digitize them for introduction into the graphics subsystem 16. The scanning is done in color and storage of the images is also in color. The artist uses computer screen 15E to edit the scanned images and to prepare some or all of the graphic overlays required for personalization. For purposes of editing, the pre-printed backgrounds may also be scanned and stored for use during preparation of personalization overlays. The graphics subsystem edits the digitized feature details and shading patterns and introduces them via lead 17 to the printer control computer section 13C for use on the laser printer 13. The printer control computer 13C stores the graphics files for use during printing, or uses them directly from the graphics subsystem.

At this stage, the laser printer 13 is ready to print on the collated sets of background sheets which include both standardized text and graphical backgrounds employing the various facial components received from the optical digitized 15 and the graphics subsystem 16.

The source of personalized information for the system is the data card or data input sheet 20 which is illustrated in FIG. 5. As illustrated therein, card 20 is suitable for manual entry via a keyboard 21 with its associated video monitor 22 as shown. The same information may be encoded for machine reading in card reader 23. This dual method of inputting data is illustrated in the Rosewarne patent referenced above.

Information from the data card 20, regardless of its method of input, is introduced via lead 24 into data/order entry subsystem 25. The data/order entry subsystem 25 communicates all of the data contained on the data card 20 plus data received from other internal management systems to other subsystems either via network, or via shared file storage. Information from the data/order entry subsystem is called up for each printing run by the product definition and printing subsystem 30 over lead 26.

Figure 7:
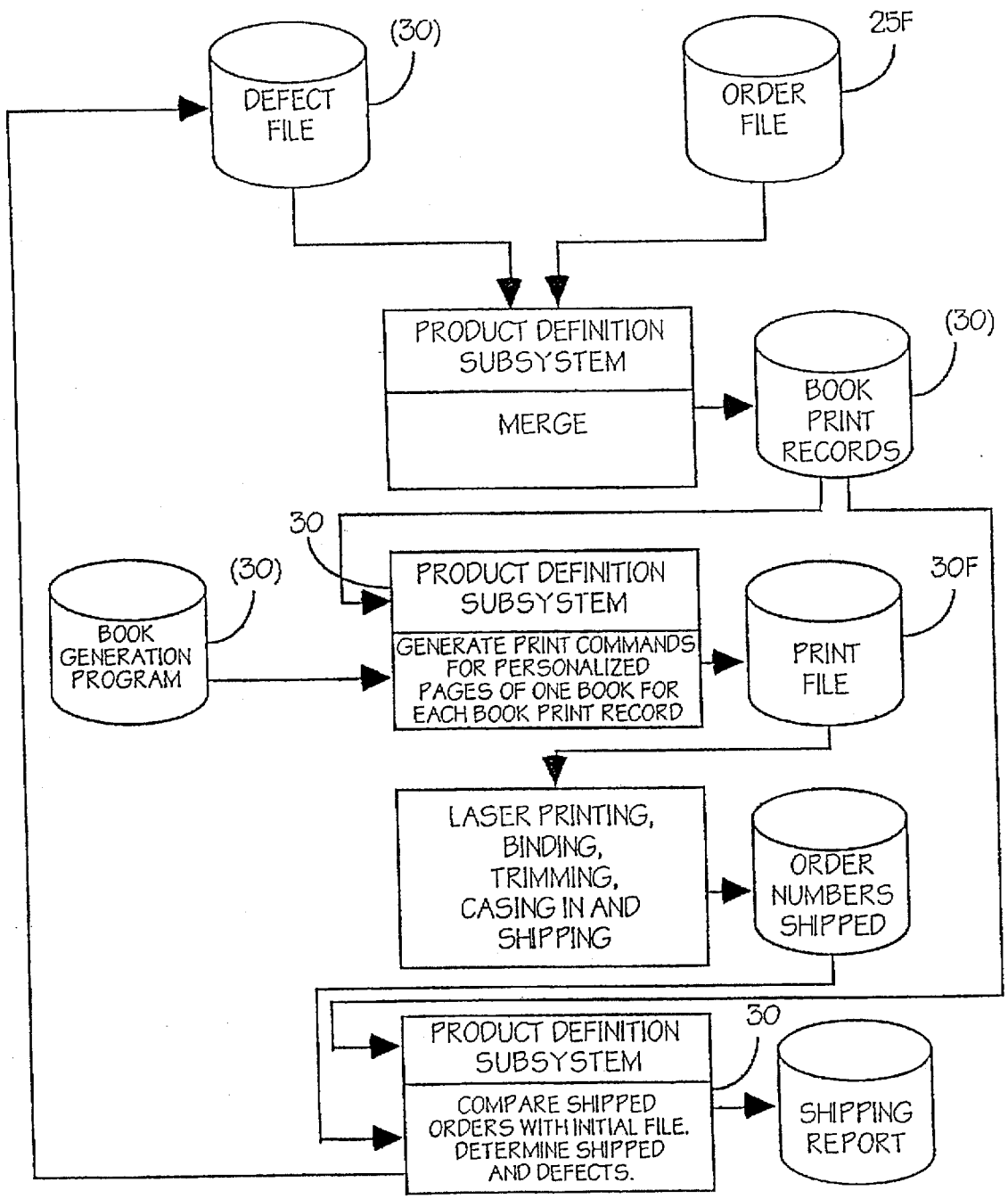
FIG. 7 is a flow diagram for the operation of the product definition subsystem of this invention.

The function and operation of the product definition and printing subsystem 30 is illustrated in FIG. 7. This subsystem 30 provides the controlling input to the laser printer 13 and its printer control computer 13C over lead 31. Lead 17 has already supplied the graphics and font files which are held on storage media such as disk or CD-ROM available to the printer control computer 13C. The printer control computer produces, in each respective book, the appropriate personalized graphics and text. The standard background and text are contained on the pre-printed page sets introduced into the laser printer's input tray.

The output of the laser printer 13 is a series of unbound signatures and invoices and shipping papers ready for introducing into the trimming, binding and casing equipment of the publisher. This is represented by production equipment 32 as combined in a single machine. Typically, these functions are each conducted separately; but, for ease of comprehension of this invention, they are shown as a single piece of equipment.

Completed, bound books are introduced into the fulfillment subsystem represented by table 33 on which each of the several successive books 34 are laid out with bar code contained on the invoice, mailing label or other sheet associated with each respective book, ready to be read by a bar code scanner 35 connected to fulfillment subsystem 36. The data read by the bar code scanner 35 connected to the fulfillment subsystem is fed back via lead 40 to the product definition and printing subsystem 30 to verify correctness of the product produced. Approved product is then ready for shipment.

Create Graphics Files

Figure 3:
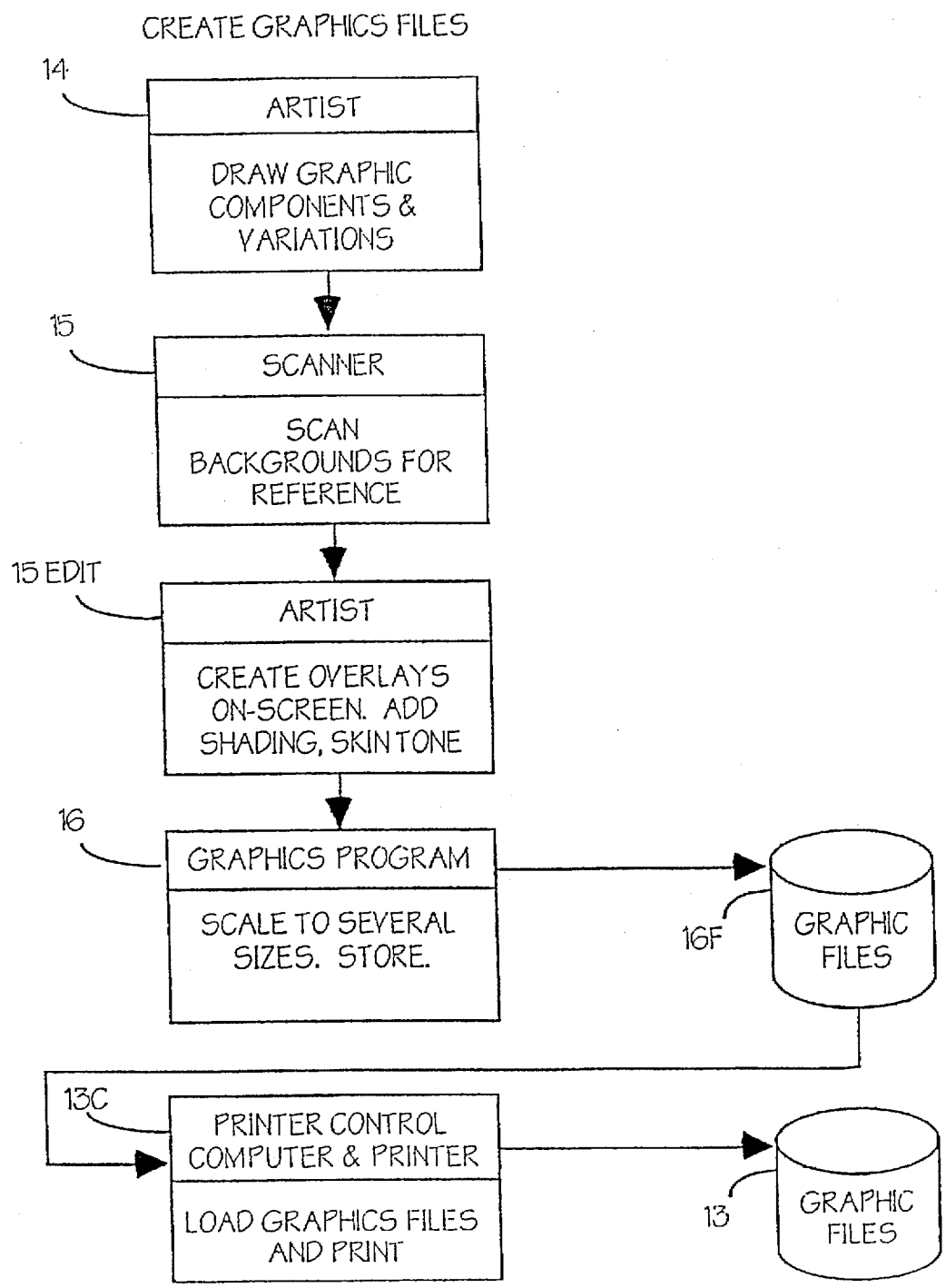
FIG. 3 is a flow diagram for the graphics creation steps of this invention.

FIG. 3 is a block/flow diagram of the process used to create graphics files that will be used by the laser printer 13 of FIG. 1. These files are used by the laser printer to overprint pre-printed, multicolored backgrounds as illustrated in 13 of FIG. 4 in order to create personalized images. Each graphics file represents one variation of one art component. Each of what is referred to as a file may be either an actual computer file, a component in a database, or a "resource" in the sense that it is a component of a larger unit of storage maintained by some standard operating system mechanism on the computer. The preferred implementation is one in which the files are records in a database managed on a network file server.

Each graphics file is created by an artist using a sophisticated graphics process. The artist begins by scanning the pre-printed pages for a book. Viewing the scanned art for a page on a graphics workstation, the artist draws the personalization overlay components on a graphics workstation using appropriate graphics software. The software allows the artist to draw components in a separate "layer" floating in front of the scanned material and it then stores this layer as a separate piece of art as the artist completes each overlay. All overlays are drawn in full color. Because the overlay is drawn in complete visual alignment with the background art on the graphics workstation potential problems with registration and size mismatch are completely avoided.

Figure 10:
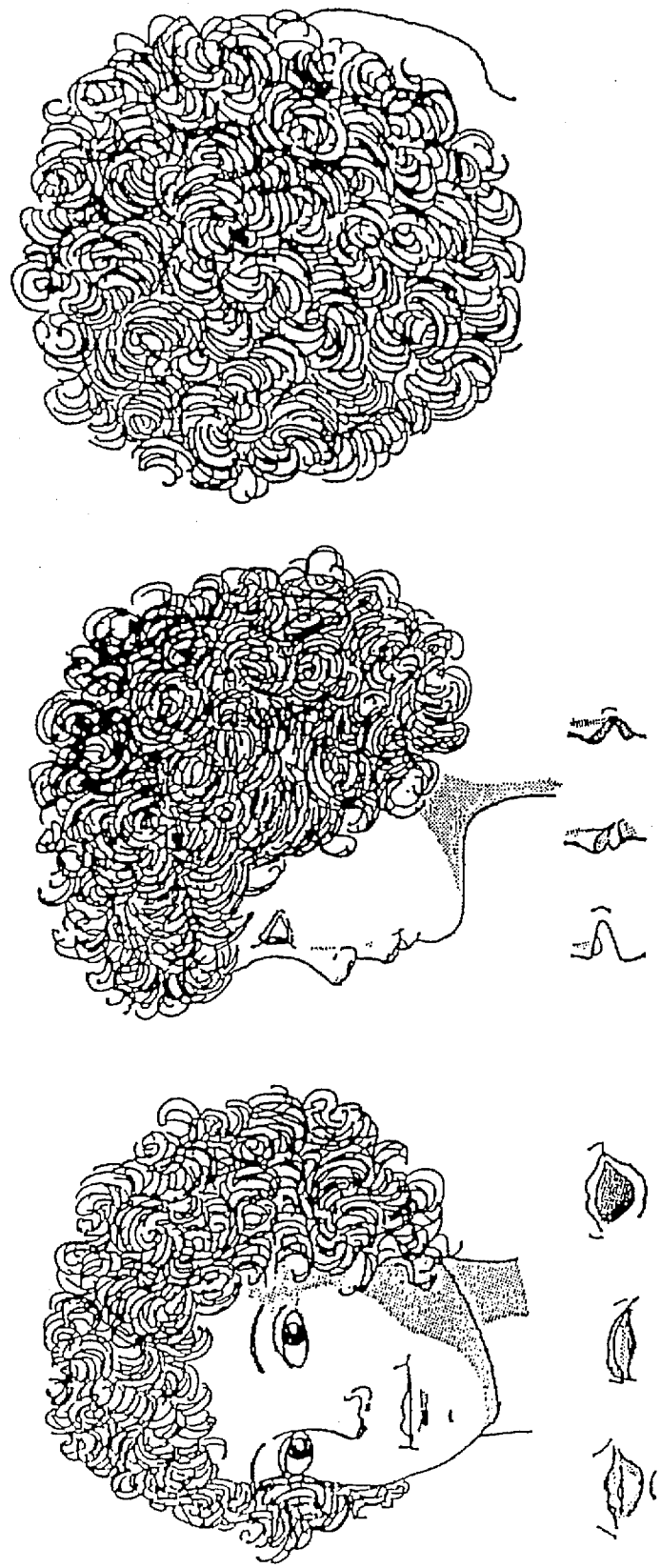
FIG. 10 is a composite of three different artist renderings showing a child's head at three different angles and with four different mouths.

There can easily be 450 different hair styles, 24 mouths, 18 chins, 10 nose-eye combinations, six glasses, and two sets of freckles for each aspect. Three aspects selected are back, profile and three quarter views as illustrated in FIGS. 10 and 12. In addition to drawing the line detail, the artist also specifies what density of overlays are to be used with each drawing and delineates areas of shading. Each edited graphics file and each shading specification is then given a unique file name and is stored temporarily on mass storage within the graphics subsystem 16.

The different sizes of overlays required for close-up, middle and distant pictures as illustrated in FIGS. 12 can also be created by the artist at the graphics workstation using the same graphics software and measuring the result directly against the appropriate pre-printed backgrounds on the screen.

These graphics files can be displayed with their associated background files on the graphics workstation's video screen for quality control purposes. They are also printed on a local color printer for quality verification and to check the registration. They are ultimately compressed and stored on mass storage within the graphics subsystem 16.

The graphics files are then converted into graphics files compatible with the production laser printer 13. These files are then made available to the production laser printer either through a network file server, or via physical transfer of storage media from one computer to another. These graphics files may now be printed on the production laser printer 13 by the printer control computer 13C.

Overprinting Pre-Printed Pages

Figure 4:
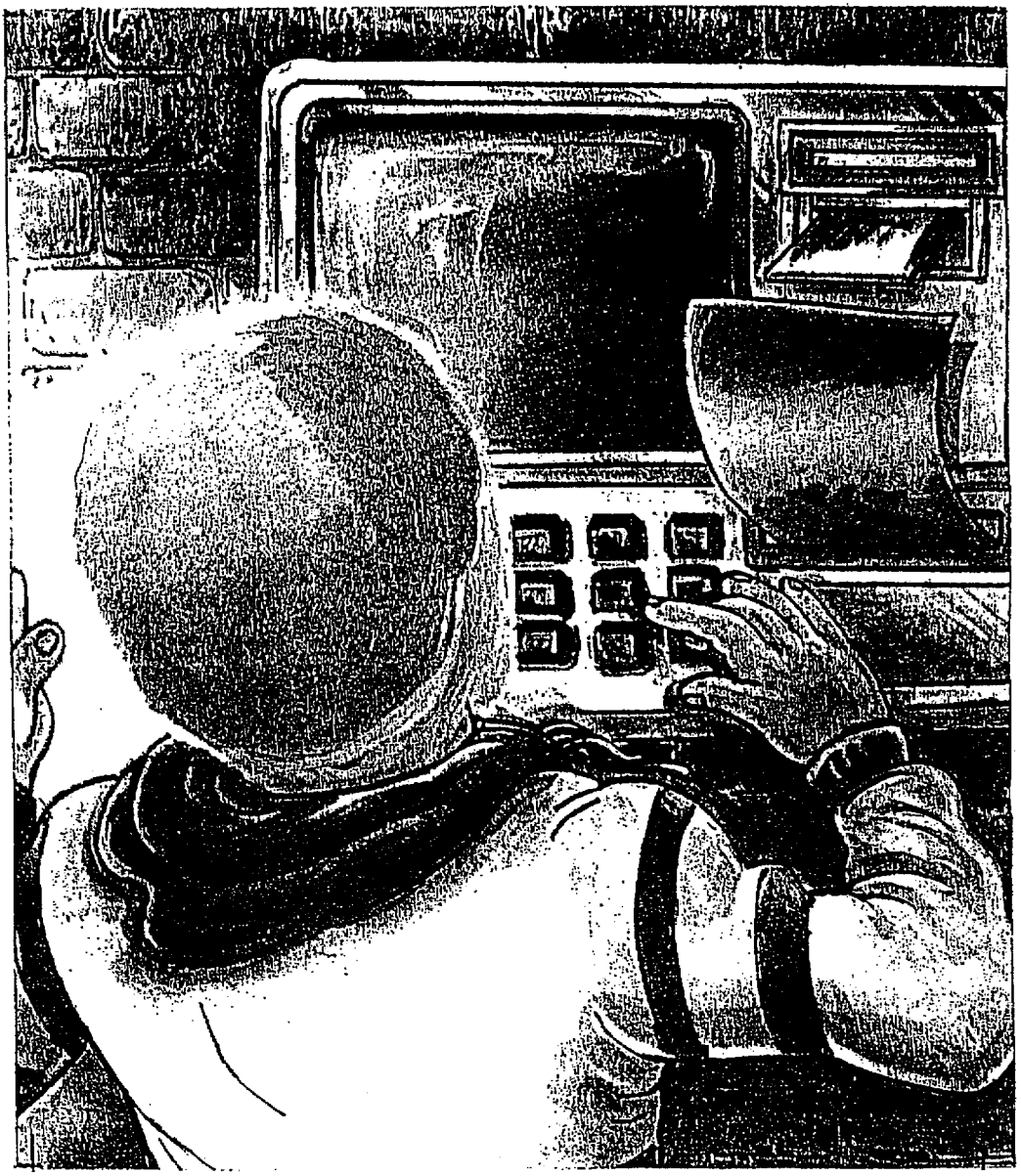
FIG. 4 is a pre-printed multicolored background used in this invention.

To aid in understanding the process, reference is now made to the paper items used in connection with this invention. FIG. 4 represents a colored background sheet as prepared by the artist at board 10 and printed on the multicolor offset printer 11. Note that it includes alignment marks and a bar code indicating the products, i.e. which book, and the page of the book as well as color registration and cutting line symbols. Note that the hands, face and hair regions of the subject are colored, a light flesh tone for the hands and face and a yellow for the hair. The video screen and portions of a card are blank as are the ticket and paper tape emerging from the computer illustrated in FIG. 4. Through the additive process described below, the page is personalized through the use of personalizing text laser printed on the illustration (video screen, ticket, and text) and the graphics are personalized by changes in the skin tone of the hands and face, and of the hair by the addition of shading and lines indicative of girls or boys hair styles, and overlays to darken the hair to the appropriate shade. Starting with this pre-printed background sheet with basic coloration for the child, this invention allows true graphical personalization for the child.

FIG. 5 shows one form of data input card for supplying data used to personalize the text and the graphics. The card includes the name, address, age, and sex of the child, as well as birth date and several physical characteristics. This data card may be completed by the person himself or by a friend or relative. The card of FIG. 5 is designed for manual entry into the system but machine readable cards are equally useful. The Rosewarne patent cited above shows a sample of machine readable cards used for data entry.

Figure 11:
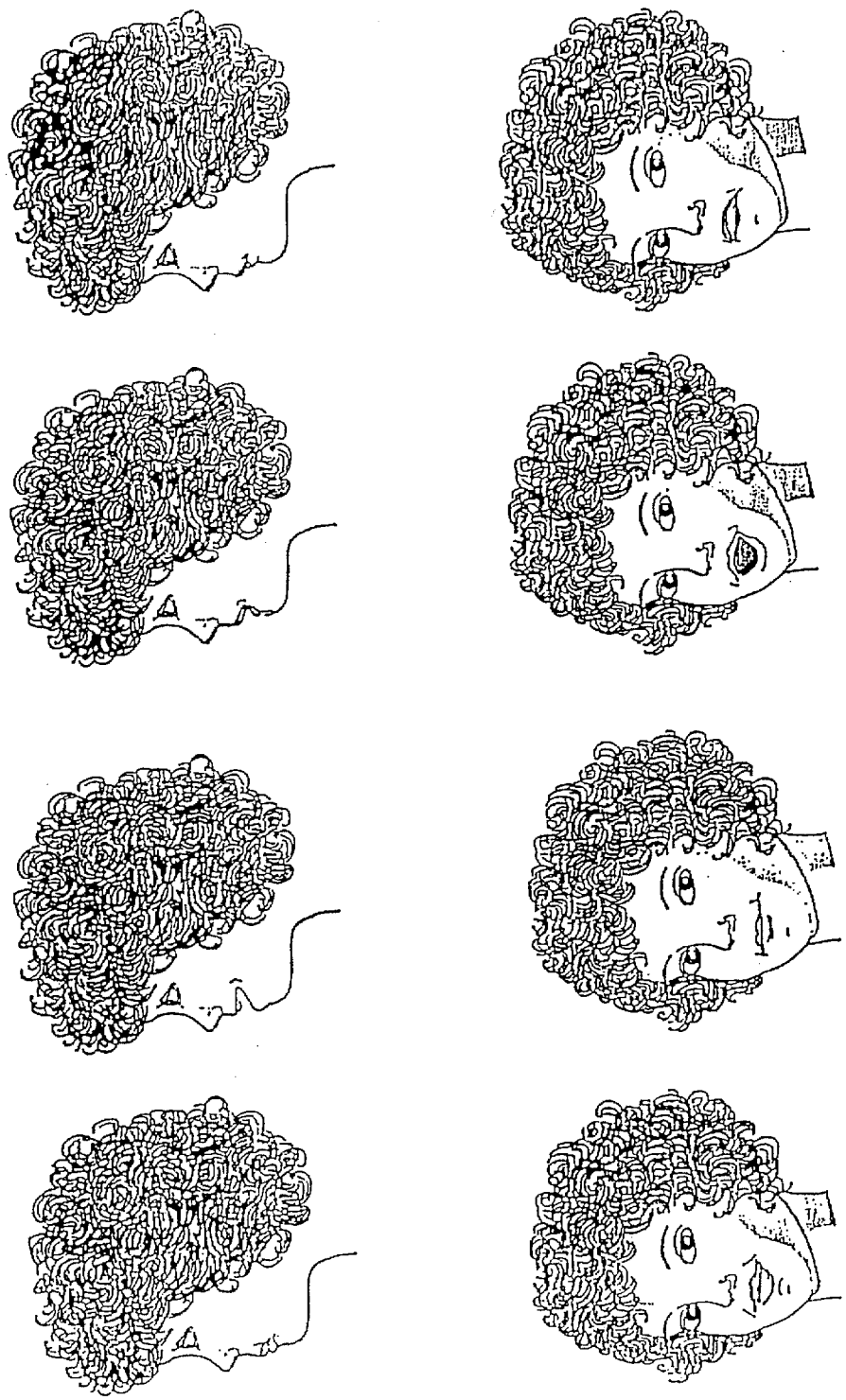
FIG. 11 is a composite of four profile and four near front face views using different mouths.

FIG. 10 shows the same face viewed from three different angles and shows four different mouth forms. These would not normally appear on a single sheet but might appear in a single book. This illustrates the variations possible in carrying out this invention. We have found that by substituting different mouths while holding the eye nose combination constant, we can allow a wide range of expressions, from sadness to elation, to be represented in a caricature with a reasonable degree of accuracy. These are clearly demonstrated in FIG. 11 in which only the mouth is changed to change the expression.

Added versatility through the use of computer control is present in this invention by means of change in size or scale and reversal of direction (horizontal flipping) as illustrated in FIG. 12. The same three images present in FIG. 10 are now changed in size and reversed in direction to allow for appropriateness of the graphics in consideration of the text and background graphics used.

Figure 13:
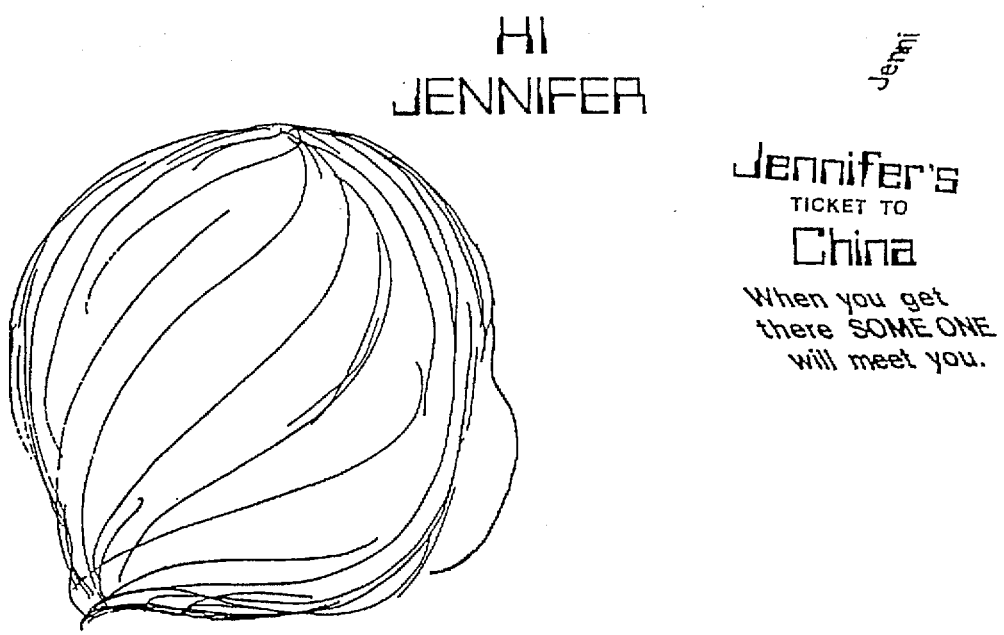
FIG. 13 is a composite of line graphics detail for a girl's hair and different type fonts used in this invention.
Figure 14:
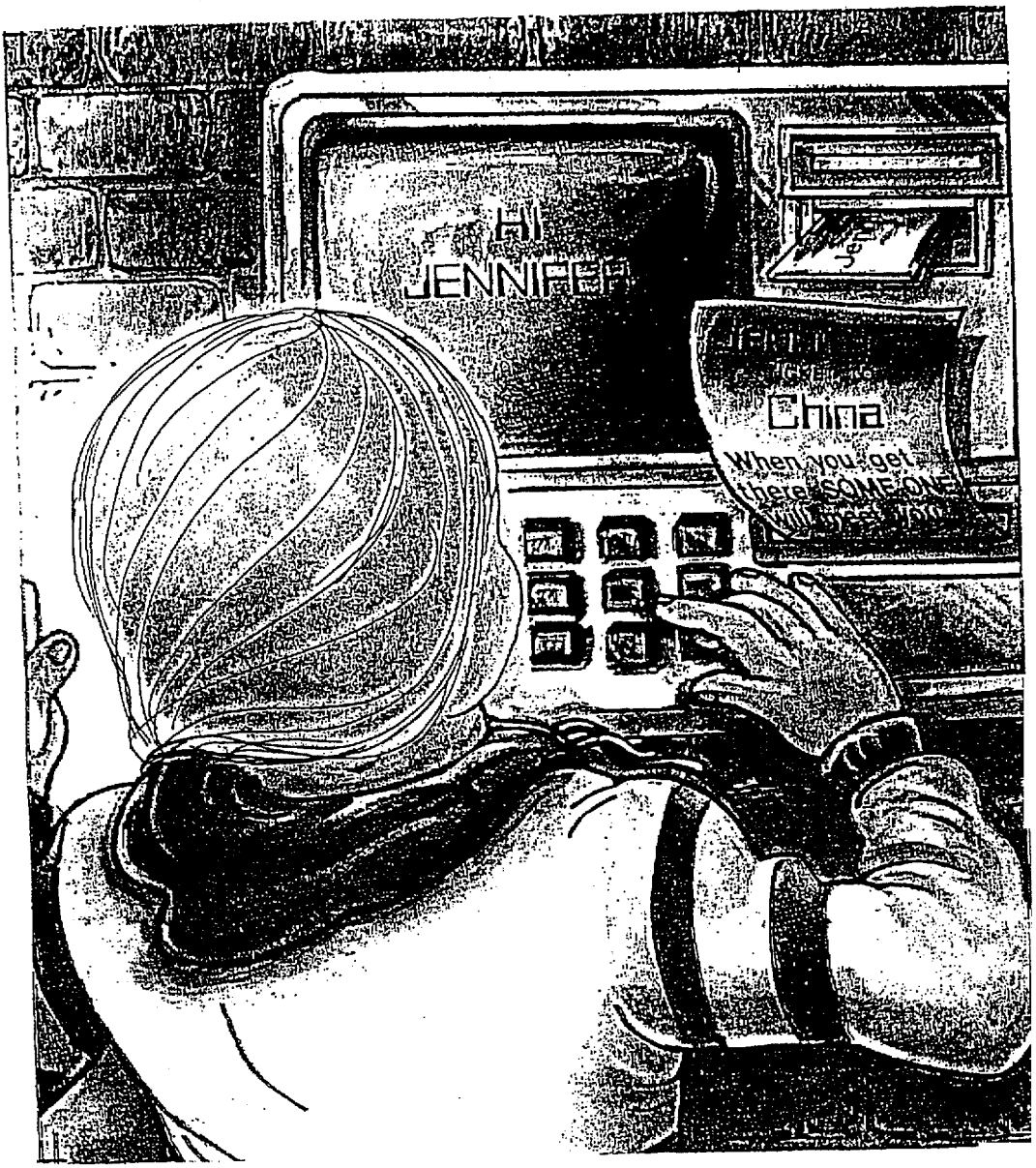
FIG. 14 is a sample completed page before trimming and binding according to this invention.

FIG. 13 illustrates the line drawing used to accentuate the lines of the hair which are superimposed upon the basic background as illustrated in FIG. 4. FIG. 13 also illustrates the different text types which can be used as appropriate. The net result of combining the pre-printed background of FIG. 4 with the line and type styles of FIG. 13 is the completed yet untrimmed sheet of FIG. 14.

Figure 15:
FIG. 15 and 16 are sample completed pages using the same background as in FIG. 14 but with different shading and hair style.
Figure 16:

The same background of FIG. 4 and a different hair style and screen shading are combined in FIG. 15 to illustrate a curly haired, darker skinned boy called "Jason". "Mary", a dark, straight-haired girl of the basic coloring of FIG. 4 is illustrated in FIG. 16.

Figure 17:
FIG. 17 is a sample pre-printed multicolored background including basic coloration for the heads and hands of a child in several body positions.
Figure 18:
FIG. 18 is a sample of the same background as present in FIG. 17 with detail line graphics and shading added illustrating the versatility of this invention.

An example of the use of a change of angle to match the various graphical situations is illustrated in FIGS. 17 and 18.

In FIG. 17 the background includes full coloration of the surroundings and clothing while the hands and face are illustrated in the basic light tan with the hair region having a light yellow background. Through the use of overlays and the selection of the curly hair type as illustrated in FIG. 18, the four figures, all depicting the same face but at different angles, have been completed.

Figure 19:
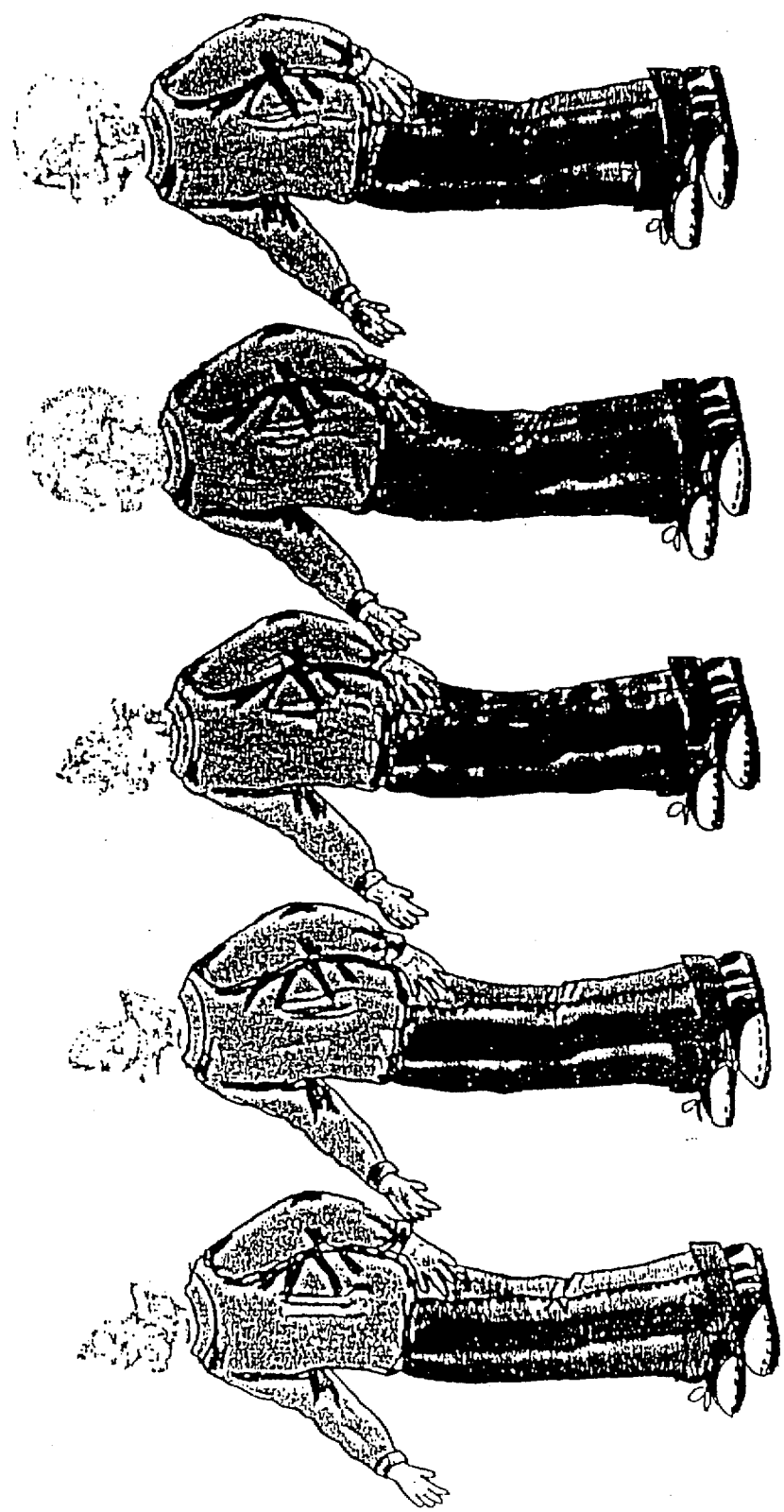
FIG. 19 is a sample of a generic body repeated five times.
Figure 20:
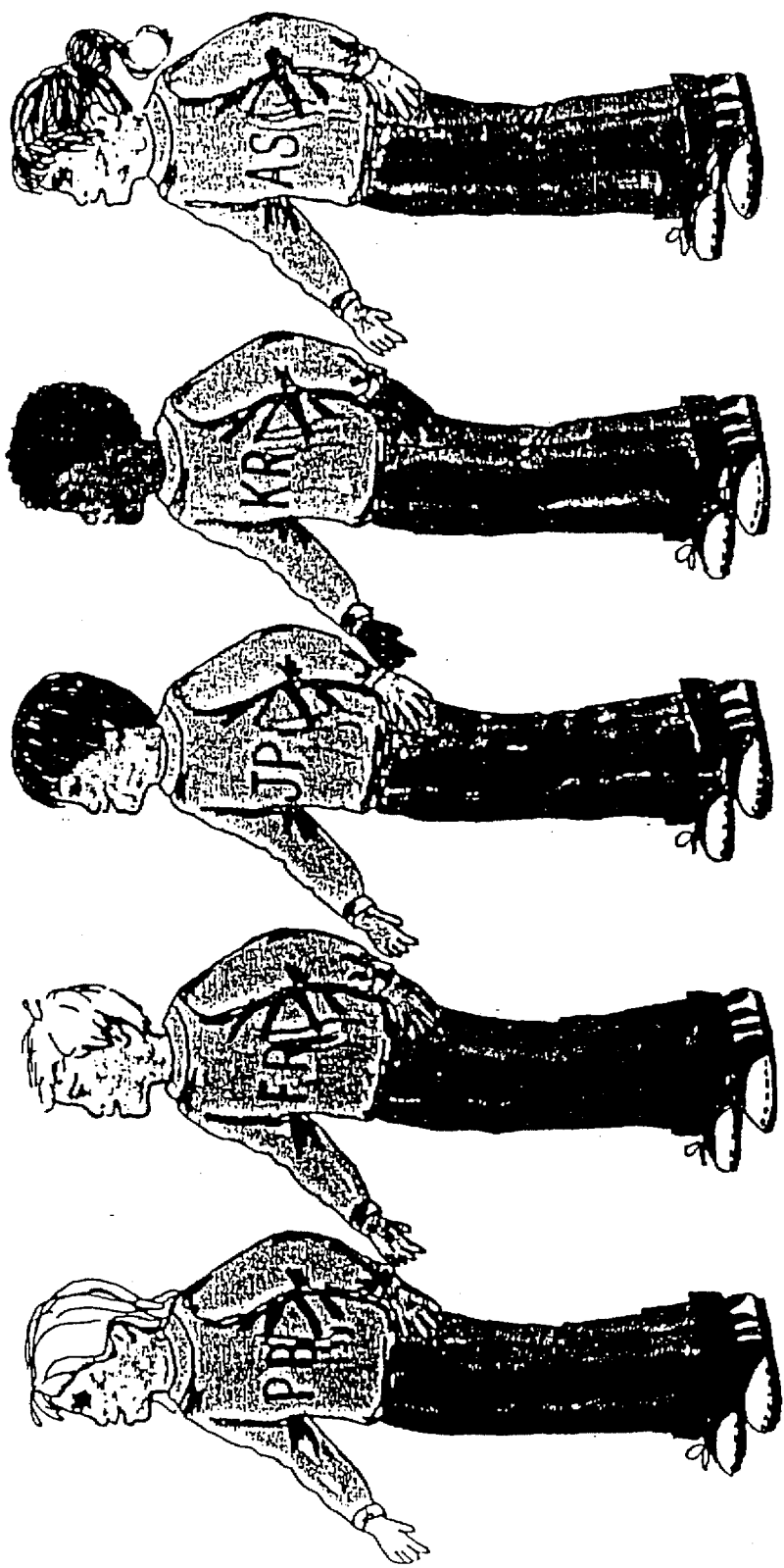
FIG. 20 and 21 are samples of a total of ten variations of the shading, details, hair styling and screen overlays as well as personalized initials all using the generic body.
Figure 21:
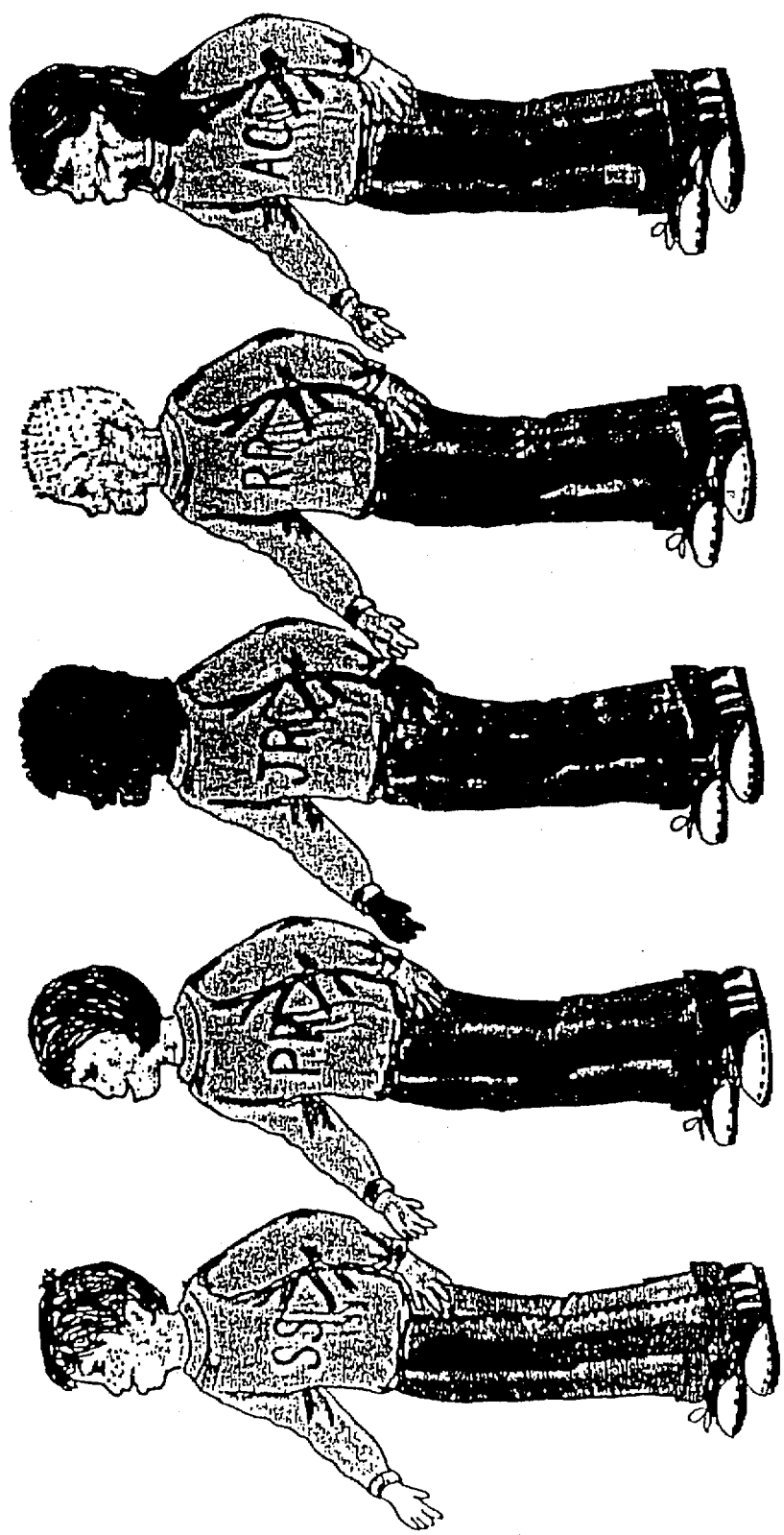

The further adaptability of this invention is illustrated in FIGS. 19 through 21. A generic child's body is repeated five times in FIG. 19 with the basic background, yellow, present in the face, hands and hair regions. By selection of different hair styles and coloration of the skin and hair, ten recognizably different youngsters are represented. Personalizing typefaces also allows each child to have his/her own initials on his/her shirt. Also, typefaces designed as if viewed at various angles can be employed in order to give perspective to the drawing.

Book Production Overview

Figure 9:
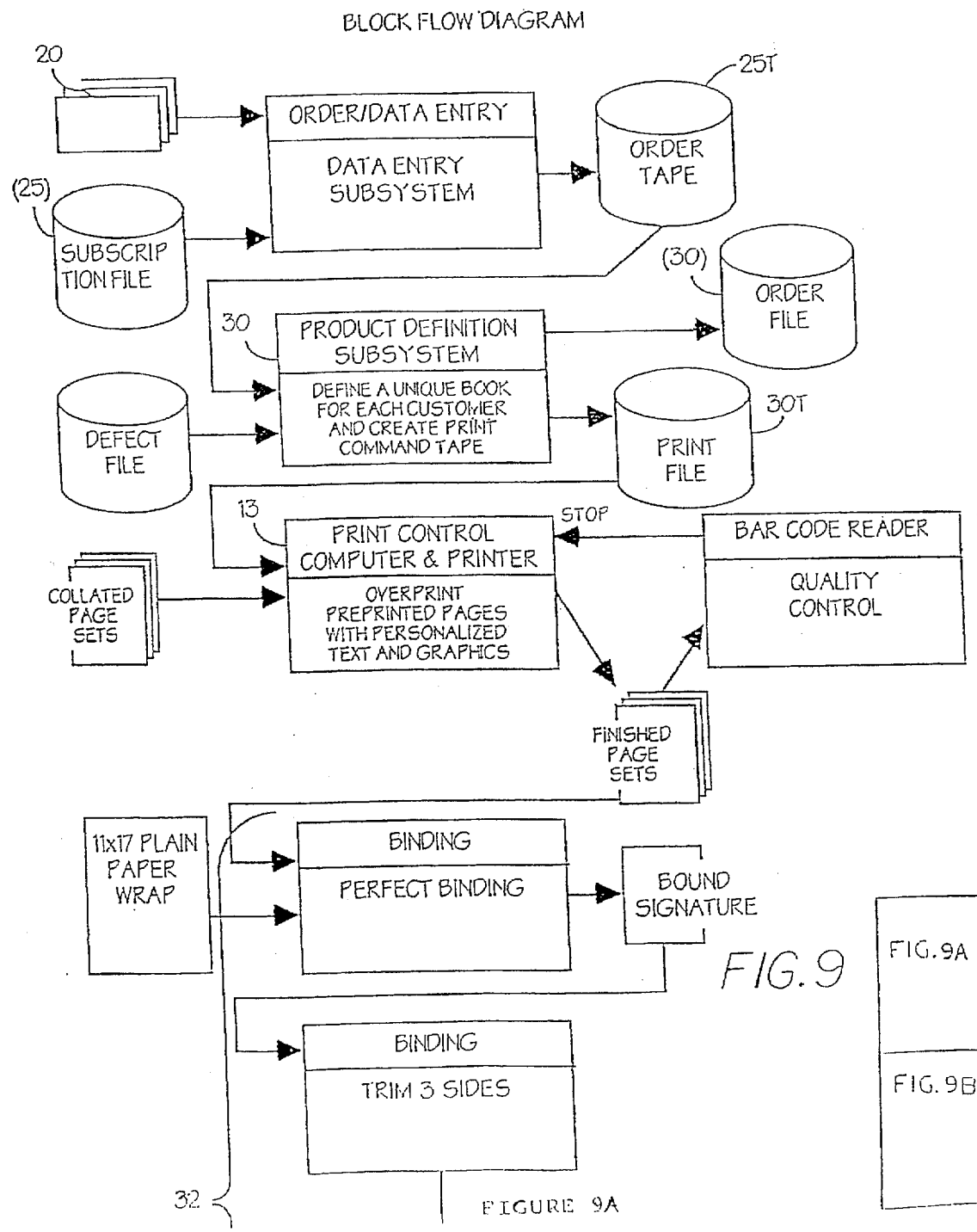
FIG. 9 is a layout diagram for 9A & 9B which represents a flow diagram of this invention.
Figure 9B:
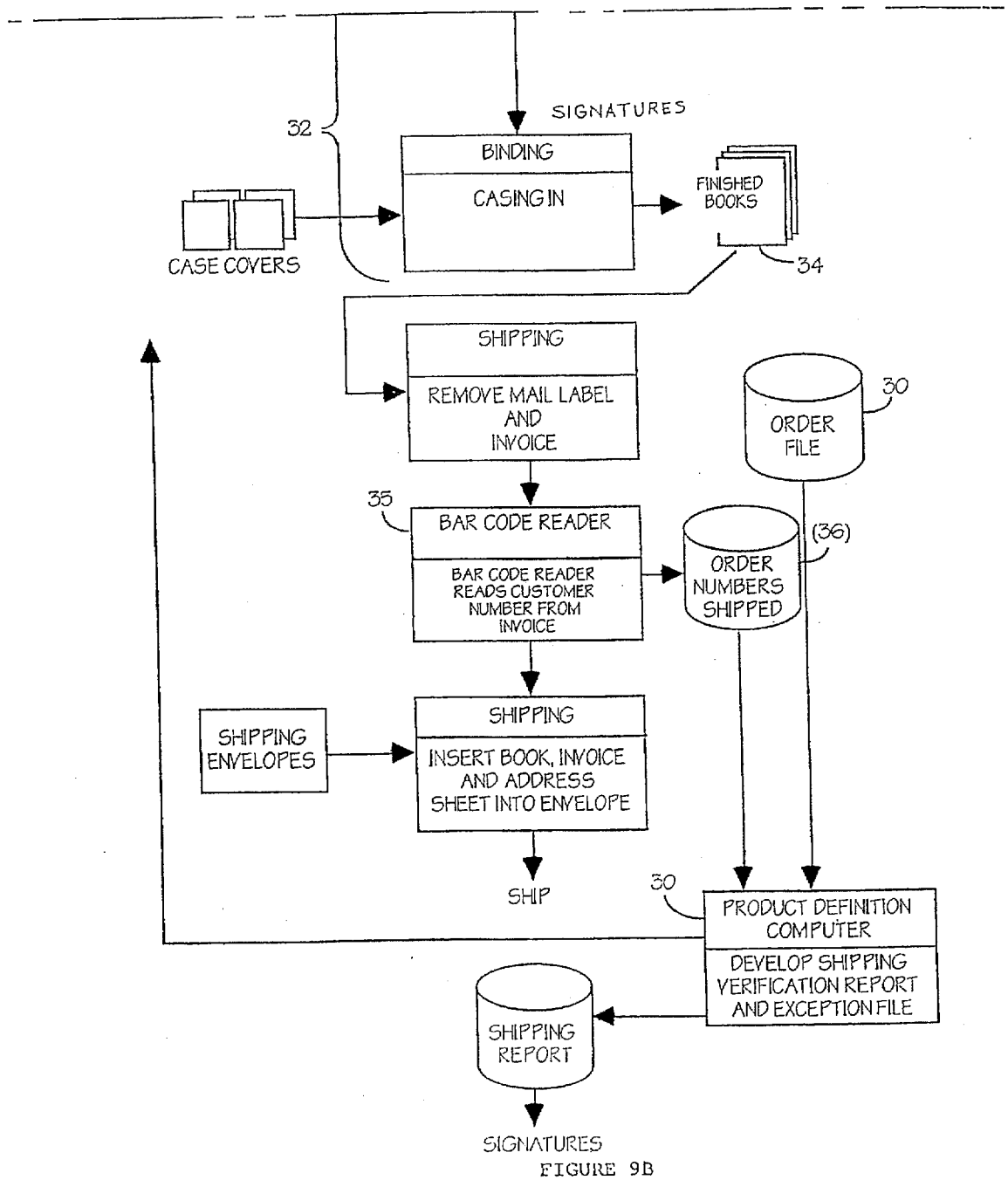

FIGS. 9A and 9B represent a block/flow diagram of the operations involved in transforming order forms into finished products. It does not consider the preparation work involved in writing and illustrating the books or creating the graphics and font files for the laser printer 13, as previously described. The order form 20 is entered into the system at the data/order entry subsystem as shown on FIG. 6 and as detailed under the section ORDER ENTRY (below). The output from this order entry activity is the order file or database which contains book order records.

The product definition and printing subsystem 30 has access to the files or databases created by the data/order entry subsystem and reads these as is shown in more detail on FIG. 7 and as is described under PRODUCT DEFINITION. Defect reports from the previous run may modify records in this file or database as will be described below. The product definition and printing subsystem 30 then uses a program specific to the book being printed to read the order file and create a print file 30F. This print file is then made available to the printer control computer 13C.

Figure 8:
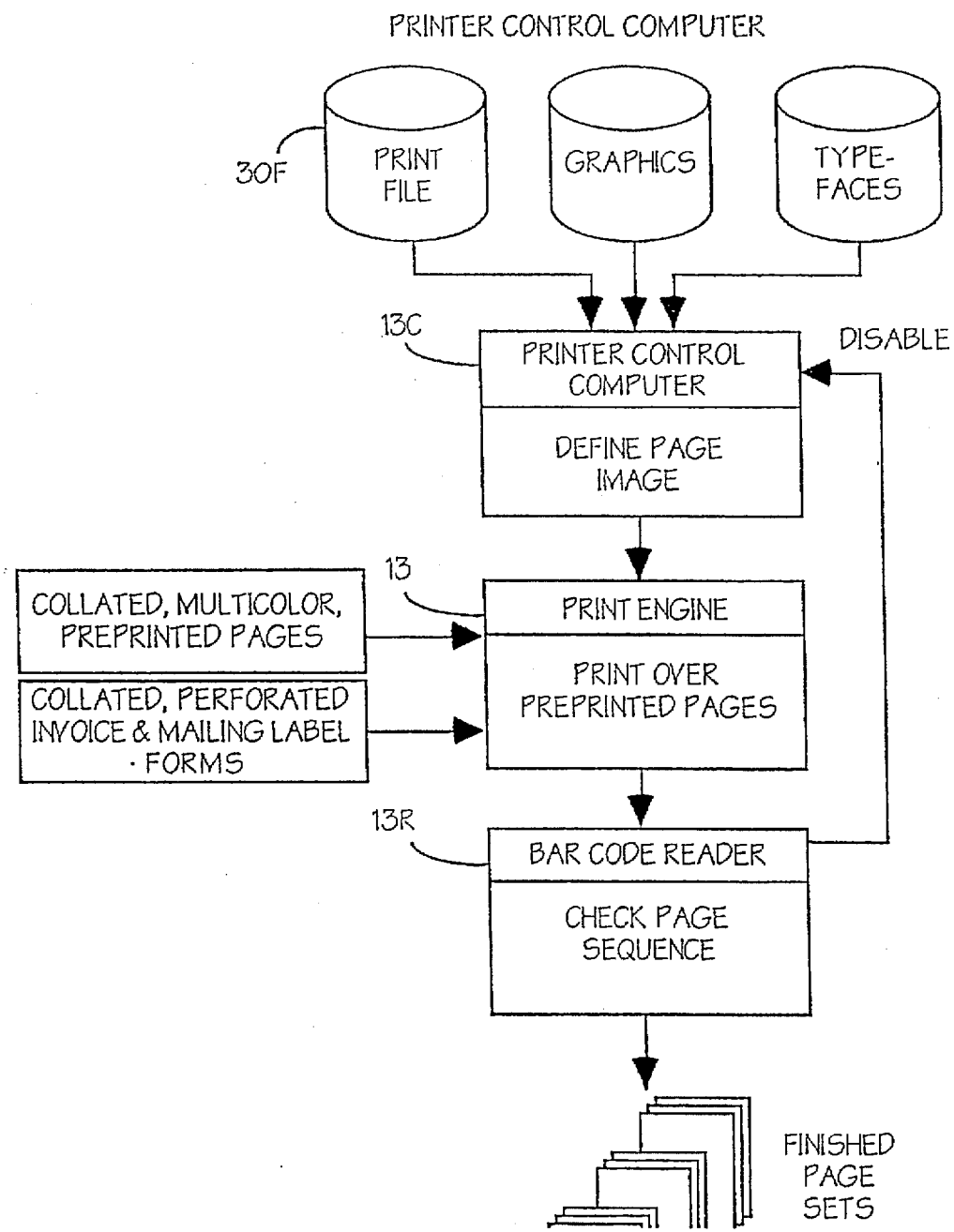
FIG. 8 is a flow diagram for the printer control computer operation of this invention.

The printer control computer 13C as shown in more detail on FIG. 8 and as described under LASER PRINTING uses the print control language contained in the scripts in the print file to retrieve appropriate typeface and graphic information from its internal disk storage (as originally furnished by the graphics subsystem) and it then formats text and graphics to create the image of a printed page. The laser print engine 13 then imprints this image upon pre-printed pages and generates sets of finished pages. A bar code scanner 13R checks the sequence of pages coming from the printer for quality control purposes.

The finished pages are perfect bound 32 and wrapped in an 11 by 17 inch sheet of plain paper to form bound signatures. These signatures are trimmed on three sides and cased into hard covers to form finished case bound books 34.

The finished books are physically transported to the shipping department 33. The last pages of the book are perforated card stock and have the invoice and shipping label. These pages are now torn out of the book. A bar code scanner 35 reads the order number from the invoice. This order number will be transferred to the product definition and printing subsystem 30 to report a finished and shipped book. At this point the order is marked as complete, and is later deleted from the order file.

The mailing label and invoice are then placed with the book into a windowed mailing envelope and are mailed to the customer. From the orders which are marked as shipped in the order file, two reports are generated. The shipping report details all of the books shipped. The defect report contains those order records that failed to be matched by a shipped book. The records corresponding to missed books remain in the order file so that each missing book is reprinted.

Product Definition

FIG. 7 is a block/flow diagram of the product definition activity. The product definition and printing subsystem 30 receives order records and generates a print file 30F. The order records are written in terms of names, hair styles, sex, etc. The print file 30F is generated in terms of the text and graphics to be placed upon individual printed pages.

A secondary activity is to assure that every book actually gets shipped. If a book gets shipped, the product definition and printing subsystem 30 is updated with information from the fulfillment subsystem 36 when bar code reader 35 reports a problem. If a book is found to be missing, the product definition and printing subsystem 30 attempts to replace the missing book the next time the appropriate pre-printed pages are placed in the laser printer.

The first step in product definition, therefore, is to read order files 25F and generate a composite file of book print records. The product definition and printing subsystem 30 then uses the appropriate book generation script to read one book print record at a time and generate the printer control language necessary to define all of the pages to be printed within that particular book. The resulting print file contains the printer control language commands needed by the printer control computer to generate a series of books. Each book within this series will be of the same story line and will use the same pre-printed pages but each will be overprinted with uniquely personalized text and graphics.

The print file is used by the printer control computer 13C. FIG. 8 shows the flow through the laser printing and the binding. As the finished books go through the shipping process, the order numbers are read from the invoice forms and are reported as orders shipped.

The product definition and printing subsystem 30 compares the file of book print records with the order numbers shipped. It reports those shipped by marking their records in the order file.

In a typical installation, the reporting of books shipped and the reordering of unshipped books is done in real time using a batch control number. The product definition and printing subsystem signals the printer operator that books with a particular story line are needed, how many books are needed, and the batch number. The operator signals the subsystem when the printer has been set up with sets of pages for that particular book. The product definition and printing subsystem then prints all orders for that particular book. The batch of books is bound and shipped, and order and batch numbers are recorded in the fulfillment subsystem. The shipping clerk reports when the batch has been completely shipped, at which time the unshipped or missing orders from that batch can be automatically reprinted. They are reprinted because they remain marked as "unshipped" in the original order file 25F.

Production Definition Software

The product definition activity uses both commercially available software and a custom program written specifically for this invention. The custom program will be referred to as the book generation program described below.

The database management program referenced above is used to create the order file used by the product definition and printing subsystem, the same program, running as part of the fulfillment subsystem updates the order file, marking the records which correspond to shipped books. This program is also used to create management reports such as the Shipped Books Report and the Defects Reports.

The book generation program uses book order records to create the print file 30F which, in turn, is used by the printer control computer 13C to generate completed images on paper. The book generation program generates the series of print description language commands as required by the printer control computer 13C to print all of the pages of each book. Each record in the order file generates one set of images to be printed when the appropriate pre-printed pages are placed on the laser printer. The "printer control language" referred to is the normal command language required to control the selected laser printer. This will generally be an existing page description language such as PostScript. The Canon 550 Color Laser Copier identified below, has been selected as the laser printer 13 for this system, and it comes with a predefined page layout language. The book generation program creates commands in the printer control language which has certain variations from book to book.

Many of the print commands required to print a book are identical from book to book. These will be referred to as fixed commands. There are many commands, however, that must be personalized. These will be referred to as variable commands. The book generation program has a library of command input files composed of scripts which contain all of the fixed commands plus "macro call codes" in the location where the variable commands must be placed. See sections below on FIXED PRINTER COMMANDS and VARIABLE PRINTER COMMANDS.

The book generation program of the product definition and printing subsystem reads one book order at a time. It retrieves the Command input file (script) corresponding to the particular book from its library. It then reads commands from the input script and uses information from the book order to fill in the variable commands creating an output file. When it encounters an embedded macro code in the script, it calls the corresponding subprogram which uses data from the book order to create personalized variable commands and it passes these to the print file. This personalized information includes sex, race, hair style, name, other personal features and an order number.

Typically, this control is accomplished in real time by the product definition and printing subsystem which directly controls the laser printer. Books are printed by printer 13 and bound and transported to the shipping activity where a bar code scanner reads the order numbers from the invoice forms, all as illustrated in FIGS. 1 and 9. The database management program is then used to mark the completed orders in the order file. Records matching shipped books are included in the shipping report. Book print records with no match are output to the defect report and remain in the order file to be reprinted.

Fixed Printer Commands

This section uses FIG. 22 as an example. It also uses a convention called pseudo code. The laser printer page description language codes are somewhat cryptic. To make the description more readable, the sense of the print description language code is replaced with an English description of what the code does. This description is called pseudo code and is used in the examples cited below. The dots between lines of pseudo code represent code lines deleted for brevity and to accentuate the point of the discussion.

The majority of the print description language commands used by the printer control computer 13C are the same from book to book. These fixed commands generally describe the format of the printed page and specify the non-variable text and some of the graphics files to be printed. All of the personalization is done with variable printer commands which will be described below. An example of the print description language commands necessary to start printing the text on FIG. 22 is shown below as pseudo commands which correspond to the controls used to produce FIG. 22:
New Page
Select 12 point souvenir font
Print origin-300, 495
Print "He started home. It was hopeless."

These fixed print description commands generate the majority of text within a given book. They also select the typefaces and locations of variable text and select the locations of the graphics. They cannot, however, select the graphics files which are virtually all personalized, nor can they select personalized text such as names, etc.

The fixed printer commands for any given book are stored in a file called the command input file. This input file also contains "flags" where the variable text and graphics will be inserted. These "flags" are referred to as macros.

Variable Printer Commands

The variable printer commands used in the product definition and printing subsystem 30 manipulate personalized text and graphics. These are merged into the fixed commands by the book generation program in response to "flags" or macros inserted within the command input script. When the generation program reads a fixed command, it passes it directly to the print file 30F. When it reads a macro; however, it passes control to the appropriate routine to select the appropriate variable text or graphics file. Macros are given such names as hair, face, chin, expression, glasses, freckles and name. Before they are called, fixed commands determine locations on the page, font types, sizes and all other parameters which do not vary from book to book. Macros are of essentially two types. One selects text and the other selects graphics.

The macro "name" copies the child's first name from the book order and outputs it to the print file 30F.

The macro "hair" reads the sex, race, hair style, hair color and hair length. It then computes an identifier, typically a number, that uniquely specifies the record's combination of characteristics. This number is computed by selecting a number for the sex, multiplying that times the number of possible races, adding the number of the selected race, multiplying the result times the number of hair styles, etc., until all the select parameters have been included. This number is used to index a table of hair style files to select the appropriate file. The name or location of the file containing the appropriate hair style is then written by the product definition and printing subsystem 30 to the print file 30F as illustrated in FIG. 5. The macro has, in effect, replaced the macro name "hair" with the command or commands to print the correct personalized hair style.

Other graphic macros select different types of graphic files but they do it using the same methodology.

Below are two pseudo code listings. The first listing represents what would be in the command input file to print the page of FIG. 22. It contains the print description language necessary to print the page with only the codes needed to print the personalizing text and graphics missing. In the place of these personalizing commands are macro call codes or macros.

New page
Select 12 point souvenir font
Print origin 300, 495
Print "He started home. It was hopeless."
. . .
. . .
indent
Print When he left,"
Macro: name
Print "poked"
. . .
. . .
Graphics origin 1299, 921
Macro: hair
Macro: face The above pseudo code is read by the product definition and printing subsystem in 30. The fixed commands are passed directly through to the print file. The macro call codes, however, are intercepted. These macro call codes call subprograms that generate the personalizing print description language which is passed to the print file. The listing below represents the same portion of the command input file shown above that has passed through the product definition program and has had personalizing print definition language commands substituted for the macros:

New page
Selected 12 point souvenir font
Print origin 300, 495
Print "He started home. It was hopeless."
. . .
. . .
indent
Print "When he left,"
Print "Jason":
Print "poked"
Graphics origin 1299, 921
Print graphics file BH432
Print graphics file FC110

Order Entry

Figure 6:
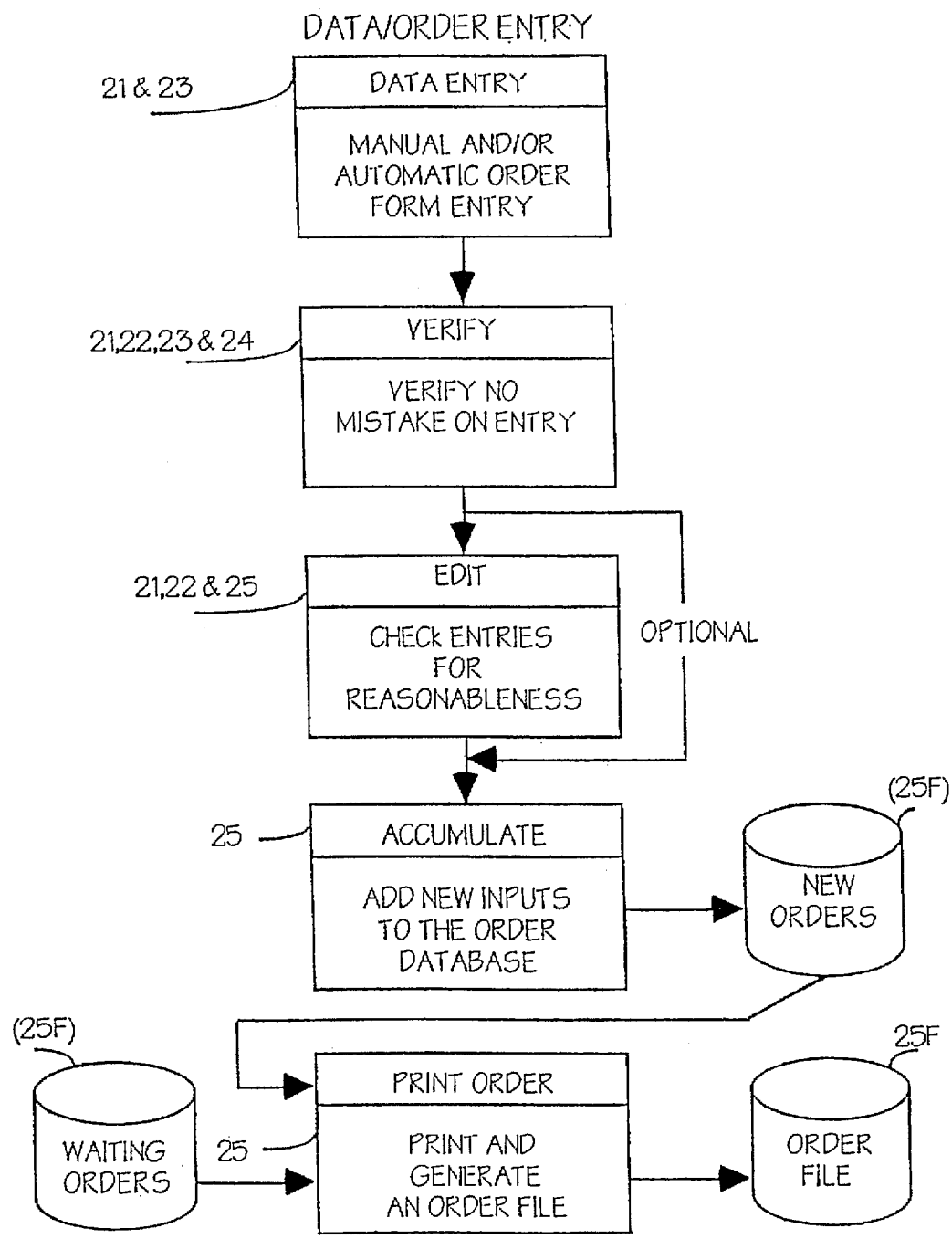
FIG. 6 is a flow diagram for the customer order entry steps of this invention leading to creation of an order file.

The order entry chain illustrated in FIG. 1 from the data card through the product definition and printing subsystem 30 is illustrated in FIG. 6, to which reference is made in connection with FIG. 6.

FIG. 5 shows one form of data input card for supplying data used to personalize the text and the graphics. The card 20 includes the name, address, age, sex of the child, as well as birth date and several physical characteristics. This data card may be completed by the person himself or by a friend or relative. The card of FIG. 5 is designed for manual entry into the system but machine readable cards for use on card reader 23 are equally useful. The Rosewarne patent cited above shows a sample of machine readable cards for use in data entry.

FIG. 6 is a block/flow diagram of the order entry activity of this invention. New orders represented by data cards 20 are received and entered into the system. These new orders are merged with orders generated from a previously existing order file 25F to generate a new order file 25F. The order file contains one record for each book to be printed. Each record on the order file has the name, address, personal characteristics, order number, product number, and other necessary information for one customer, and will result in one book being printed. The order file is used as input to the product definition and printing subsystem of FIG. 7 which, in turn, generates a print file containing actual printer commands.

The order forms such as sample data card 20 of FIG. 5 are entered into the system by manual key entry on keyboard 21 or by optical scanning in card reader 23, or by a combination of these two methods. The input data is then verified to assure that the data card 20 has been correctly read.

There is an optional step of checking each new record for reasonableness. This step checks for unlikely combinations of input characteristics and checks spelling.

Each new order record is accumulated into a file of new order records in the data/order entry subsystem 25. The new orders and orders generated from the subscription service are used to generate an order file 25F. The order file is made available to the product definition and printing subsystem 30 which generates the file 30F that controls the printer 13.

New records that failed to verify on entry or which failed to pass the reasonableness test are reported to a referee who makes the necessary corrections and adjustments.

Laser Printing

FIG. 8 is a block/flow diagram of the laser printing activity. A Canon 550 Color Laser Copier (CLC) has been selected to perform this activity. The standard printer is modified to add a bar code reader 13R and the necessary software logic to allow automatic stoppage if a quality control problem is detected by an error in page order.

Prior to printing any books, the graphic and font files are loaded into the printer control computer 13C from the graphics subsystem 16. The printer control computer has sufficient storage capacity to hold all of the files which are to be imaged. See FIG. 3 for the flow of creating graphic files.

The printer control computer 13C uses the print file commands in concert with stored typefaces and graphic files to compose one page at a time for output to the laser print engine.

The print engine takes pages from its input tray, which contains collated, multi-colored, pre-printed page, and overprints them with the desired text and graphics. Each new pre-printed page must be the appropriate page to overprint with personalized text and graphics. Each page has a page number and product number bar codes pre-printed on it.

Following the pages of a given book in the printer input tray are the invoice and shipping labels. The invoice and shipping label information is also printed at this time. The pages, including the invoice and shipping label page(s), have page and product number bar code pre-printed upon them.

As the pages exit from the laser printer 13, their page numbers are checked by the bar code reader 13R, which is connected directly to the printer control computer. If anything occurs that will get the pre-printed pages out of phase with the printer, it will be manifested by out of sequence page numbers at the output of the printer. When this is detected, the laser printer 13 is stopped by the printer control computer 13C and the operator is instructed to repair the fault.

The output from this activity is a series of printed page sets. Each set will next be bound into a book and shipped.

Laser Printing Software

The printer control computer is a networked computer which specifically has access to the order files stored in the data/order entry subsystem, has access to the graphics stored in the graphics subsystem, and is also directly connected to the laser printer. All of the software involved with translating the printer control language instructions from the print file 30F created by the product definition and printing subsystem to images on the printed page is contained in the printer control computer 13C. The printer control computer takes commands from the print file and converts them to commands which directly cause the laser printer to produce images on the pro-printed page. The only added feature is a bar cede reader 13R attached to the printer 13 output for quality control purposes. Because the signal from the bar code reader is routed directly to the printer control computer, no modification of the laser printer is required.

Each pro-printed page, including the shipping label and invoice, has its page number and product number printed on it as a bar code as shown in FIG. 4 during the preprint process. The bar code is printed beyond the page's crop marks except on the invoice and shipping label, so it can be trimmed off prior to binding. The bar code reader 13R is connected to the printer control computer, which checks that the pages are exiting from the printer 13 in the proper order and a complete set is present. Any printer malfunction, double page problem, missed page, or error in the collation of the input sheets will be manifested as an out of sequence page.

The bar code reader system is monitored by the printer control computer, which stops the printer when it senses an error. The operator then corrects the problem and re-starts the operation. The printer control computer assumes that the operator has restocked its input tray with full sets of pages, and it can immediately reprint the book which would otherwise have been incompletely printed at this stage. The operator's responsibility is to assure that no partial books are passed to the binding operation. If a book is lost in the printing operation, its absence will also be detected by the bar code scanner 35 in the fulfillment operation as a missing order number.

Order Entry Software

A commercially available database management system forms the basis of the order entry software. A small custom program is t0 optionally used to check the input records for reasonableness. Data entry is accomplished by key entry at keyboard 21 or card reader 23 to screen 22 the screen of which is formatted by the data/order entry subsystem's software. This key entry is done by two operators and the entries are verified by comparing the inputs of the same record by the two operators.

The order entry editor is an optional program written specifically for this invention that checks the input records for reasonableness. A suitable program uses a series of tables. Each sex within each ethnic group has a table of probable hair styles. Each sex also has a table of probable names. The program first checks to see that the hair style entered can be found in the table of likely hair styles for the entered sex and ethnic groups. The program then checks to see whether the entered name is within the table of probable names. Records containing either verification errors or reasonableness errors are corrected by a human referee.

Verified and edited order records are entered into the new input file by the database program. The database program is then used to reformat the input records, merge them with orders generated from the subscription service, and write the resulting file to the order tape 35F.

Equipment List

We have found that the following equipment provides the needed capability to carry out our invention:

Offset Printer 11:
Heidelberg 102 VP 40" Four Color Perfector.
Heidelberg U.S.A., Rego Park, N.Y.
Collator 12:
Bourg Collator System AE22
C. P. Bourg, Inc., New Bedford, Maine
Order Entry subsystem 25:
Macintosh Quadra 800
Apple Computer, Inc. Cupertino, Calif.
Laser Printer 13:
Xerox 40/50 Laser Printing System
Xerox Corporation, El Segundo, Calif.
Product Definition subsystem 30:
Macintosh Quadra 800
Apple Computer, Inc. Cupertino, Calif.
Graphics subsystem 16:
Macintosh Quadra 950
Apple Computer, Inc. Cupertino, Calif.
Optical Image Scanner 15:
Datacopy Model 912 Integrated Imaging System
Datacopy Corp., Mountain View, Calif.
Binding and Casing Equipment 32:
Horizon BQ-220L Perfect Binder Horizon International, Inc. of Japan
Trimming Equipment 32:
Atlas 3 Knife Trimmer
Atlas Graphics Equipment, Oakland, Calif.
Bar Code Scanners 13R and 35:
Welch-Allyn Model HBD-EZ
Welch-Allyn, Skaneateles Falls, New York
Fulfillment subsystem 26:
Macintosh Quadra 800
Apple Computer, Inc. Cupertino, Calif.

Database software used with data/order entry subsystem 25, product definition subsystem 30 and fulfillment subsystem 26: FILE PRO 16 PLUS, The Small Computer Company, Inc., Hawthorne, N.Y.

The foregoing describes the method and combination of apparatus of this invention allowing the production of quality personalized books with far greater versatility and truly personalized graphics. By reason of the use of a basic background for the face, hands and hair regions, and the computer controlled addition of lines and shading, a large variety of images may be rendered with a remarkable degree of correspondence to the subject.

The foregoing is merely illustrative of the principles of this invention and is not to be considered limiting. It is recognized that within the teachings of this application one could produce apparatus or method with an apparent difference by not departing from the spirit of this invention. Therefore this invention is defined not by the representative embodiment shown but rather is defined by the following claims including their equivalents.

What is claimed is:

1. A method for producing personalized graphics and personalized text printed materials comprising the steps of:
   a) generating a plurality of facial feature drawings including a variety of each feature;
   b) storing said facial feature drawings in a digital computer;
   c) generating in the computer a plurality of multicolor background scenes including standard text and figures having featureless exposed areas of a predetermined color intensity;
   d) generating codes corresponding to in size and shape with discrete exposed areas of said basic background multicolor drawings;
   e) storing said codes in a digital computer;
   f) inputting to said digital computer personalized data including features corresponding to a person intended to be illustrated in said scene;

g) selecting features corresponding to the features inputted as a part of said personalized data;

h) selecting codes which correspond to the variation in coloration of the exposed areas from the basic background as compared with the personalized data inputted; and i) printing background scenes, said selected features and color variations to produce an illustration of the person whose personalized data was inputted into said digital computer;

including the steps of:

j) storing codes in said computer corresponding to said facial feature drawings in a plurality of sizes;

k) storing said codes corresponding to said facial features drawings in a plurality of angles and perspectives in a digital computer;

l) selecting a code corresponding to the size of facial features corresponding to the size of the background drawing;

m) producing at least one skin tone darkening code for changing the color of an area to be printed;

n) storing said size codes;

o) selecting a set of human features;

p) selecting a code corresponding to the area including the human features; and q) controlling the printing of a graphical representation of the person combining the selected human features and the selected angle, perspective and color.

2. The method in accordance with claim 1 including the steps of generating personalized text corresponding to personalized data inputted into said digital computer; and integrating said personalized text into said standardized text.

3. The method in accordance with claim 1 including the steps of introducing the drawings and codes from said digital computer into a printer controller for controlling the printing of the graphical representation of the person.

4. The method in accordance with claim 1 including the steps of producing a plurality of overlays of different degrees of skin tone darkening; and selecting the overlay corresponding to the coloration for the skin tone of the person to be represented as indicated by the personal data inputted.

5. The method in accordance with claim 1 including the step of storing said drawings of features and overlay in multiple orientations; and selecting the appropriate orientation drawing of features and overlay for the view of the person to be represented.

6. The method in accordance with claim 1 including printing standardized texts and multicolored background; and printing said selected human features and selected overlay in said background to produce a figure with detail and skin tone coloration corresponding to the inputted data.

7. The method of producing personalized books comprising: producing a set of pages including standard text, standard illustrations and backgrounds including featureless human figures having basic coloration for skin and hair areas;

producing a plurality of features for human figures;

producing a plurality of skin tone darkening overlays corresponding in shape and size to the skin and hair areas of the featureless human figures;

storing said plurality of line features in a digital computer;

storing said plurality of skin tone darkening overlays in a digital computer;

inputting personalized data for a person to be represented into a digital computer including skin tone information and sex; selecting a set of features corresponding to the inputted personalized data; and selecting an overlay corresponding to the inputted personalized data controlling a printer to print the selected features and skin tone as defined by the overlay to provide a set of pages constituting a personalized book signature; and binding said signature into a book.

8. The method in accordance with claim 7 including the steps of checking the output of the printer for completeness and correct order of each signature set;

interrupting printing;

checking the output of the binding step for completion of all personalized books for each person for whom personalized data was inputted; and indicating to the controlling step the identification of any missing completed books.

9. Apparatus for producing personalized graphics and text printed materials comprising:

means for digitally encoding a plurality of graphical representations of discrete human features;

means for digitally encoding a plurality of overlays corresponding in size with said discrete human features;

means for storing said digitally encoded graphical representations of discrete human features;

means for storing said digitally encoded overlays;

means for printing sheets including standardized text on standardized background illustrations including figures having a featureless area with a base skin tone;

means for inputting personalized data including sex and indication of skin coloration;

means for selecting a set of features from said plurality of stored digitally encoded features corresponding to the personalized data inputted;

means for selecting either no overlay or an overlay from said digitally encoded stored overlays corresponding to the skin coloration information of the personalized data inputted;

means for overprinting the features and skin coloration on said sheets; and controller means for said overprinting means for directing the printing of the selected features and skin coloration to complete the personalized graphical portions of said printed materials.

10. Apparatus in accordance with claim 9 including means for storing personalized text from said inputting means; and said controlling means is operative to print personalized text on said printed materials.

11. Apparatus in accordance with claim 9 wherein said digital encoding means comprises an optical scanner and digitizer.

12. Apparatus in accordance with claim 9 wherein said overprinting means comprises a laser printer or laser copier.

13. Apparatus in accordance with claim 9 wherein said selecting means comprises a digital computer.

14. Apparatus in accordance with claim 9 including means coupled to said overprinting means for monitoring correct successive pages and completeness of number of pages of each set of pages overprinted.

15. Apparatus in accordance with claim 9 including means for the completion of the binding of said sets of pages into respective distinct books;
  means for identifying each book as completed; and
  means for indicating a missing book to said controller means.

16. Apparatus in accordance with claim 15 wherein said identifying means comprises a bar code reader.

17. Apparatus in accordance with claim 15 wherein said controller means includes a digital computer.

18. Apparatus in accordance with claim 9 wherein said selecting means comprises a digital computer.

* * * * *